INVENTOR
ERNEST WILLY WORK
ATTORNEY.

Patented Aug. 3, 1937

2,089,144

UNITED STATES PATENT OFFICE 2,089,144

CONTROL VALVE FOR WATER PRESSURE SYSTEMS

Ernest Willy Work, Toronto, Ontario, Canada

Application August 31, 1933, Serial No. 687,724

5 Claims. (Cl. 50—23)

Figure 1:
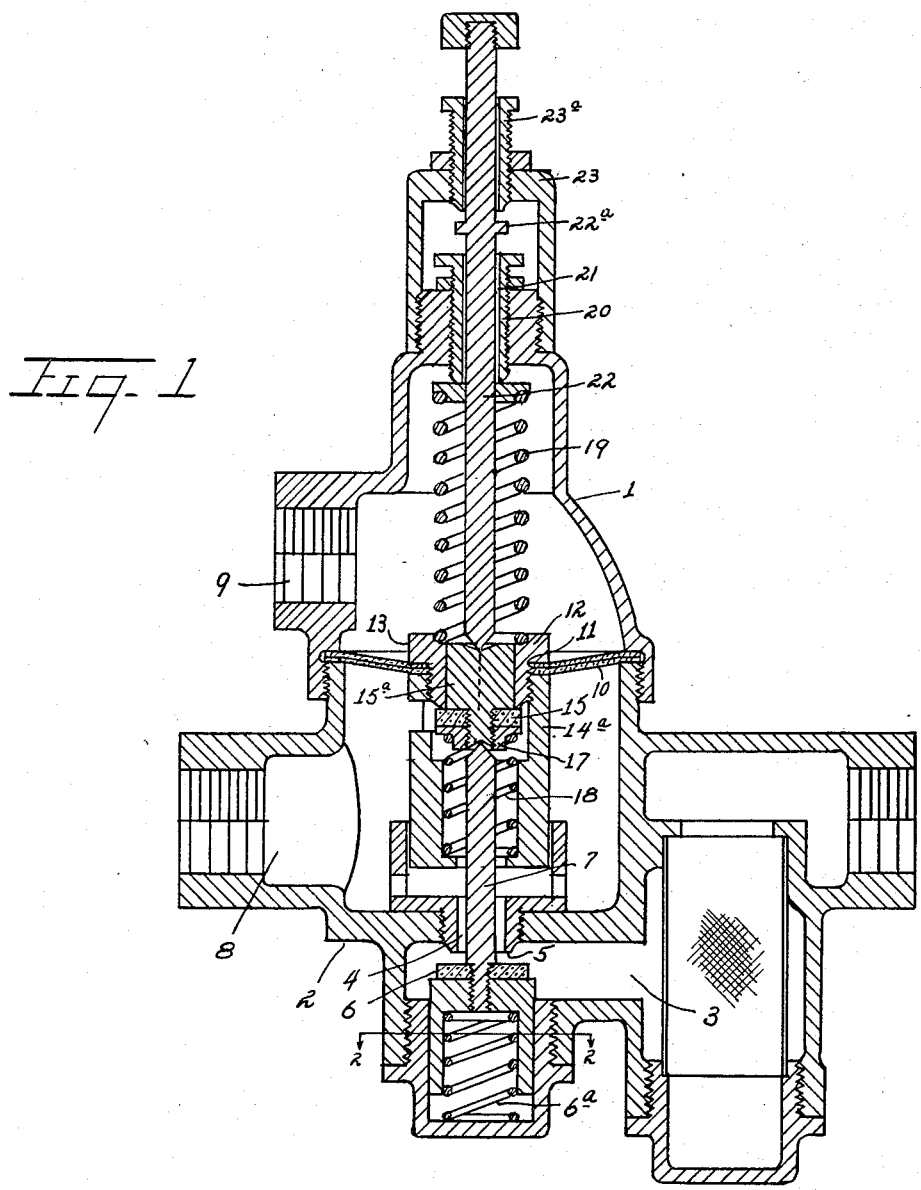
Figure 2:
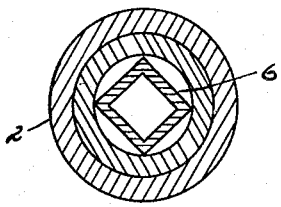

This invention relates to a control valve for maintaining the pressure in a water pressure system within maximum and minimum predetermined limits and substantially comprises a hollow body having an outlet opening adapted for communication with said system, an inlet port for the admission of water to said system through the body, a discharge port, a relief valve structure on the discharge side of said member consisting of a flexible diaphragm responsive to pressure variations, a valve seat mounted on the diaphragm, a spring acting on the diaphragm against the pressure within the system, a valve for said valve seat normally closed by the pressure within the system and adjustably movable member adapted to selectively engage and open the relief valve when the pressure in the system rises above a predetermined maximum, a valve for the inlet port normally closed by the initial pressure of the water and opened by the movement of the relief valve structure when the pressure falls below the predetermined level. The object of the invention being to provide a control valve which will be simple in construction, positive in its action and will eliminate the danger of the adhesion of the valve disc to the valve seat, due to the corrosion of the valve disc to its seat particularly after a period of inactivity during which the whole force of the spring presses the valve disc against its seat. In my co-pending application No. 666,869, I have described and illustrated a control valve somewhat similar to the control valve to be herein described, the differences between this present invention and that described in my previous application being apparent from the following description and the accompanying drawing in which:—Fig. 1 shows a vertical section view of a control valve constructed according to this present invention; and Fig. 2 is a cross section on the line 2—2 Fig. 1.

Like characters of reference refer to like parts throughout the specification and drawing.

The control valve illustrated in the drawing comprises a hollow body consisting of a head 1 and a main body portion 2 threadably connected together. The main body portion is provided with an inlet channel 3 adapted for connection to a supply of water under pressure, an inlet port 4 communicating between the inlet channel and the interior of the main body portion 2, a valve seat 5 on the said port and an inlet valve disc 6 therefor, closed by the initial pressure of the water, the valve disc being provided with a valve stem 7 which projects into the main body for the purpose to be made apparent as the description proceeds. The valve disc is supported on a spring 6a which prevents it from falling away from the seat when opened. The main body portion is also provided with an outlet port 8 adapted for communication with the system, a discharge port 9 and on the discharge side of the main body, with a relief valve structure consisting of a flexible diaphragm 10, responsive to pressure variations within the body, an orifice 11 in the diaphragm in axial alignment with the inlet port 4, a valve seat 12 mounted on the diaphragm and extending through the orifice into the main body portion, the valve seat being removably secured to the diaphragm by means of the flange 13 formed thereon and overlying the flexible diaphragm and the tubular casing 14a which is threadably connected to the valve seat. The valve seat 12 is provided with a valve disc 15 normally closed by the pressure within the system and opened by a movable stop 22 to be hereinafter described when the pressure rises above a predetermined maximum. The surface of the valve disc adjacent to the valve seat is provided with a projection or guiding member 15a preferably square in cross section which is slidably entered into the opening through the valve seat and a member 17 projecting therefrom in the opposite direction, which member is provided with a recess 18 into which is entered the free end of the valve stem 7. The valve disc is supported on a coil spring 18a which holds the valve disc in place and prevents it falling away from its seat when it is opened in the manner hereinafter described. A compression spring 19 is located within the head acts on the diaphragm resisting the movement of the diaphragm under the force of the pressure within the system, the adjustment of the pressure of the spring being effected by the compression screw 20 which is screw threaded through the head 1, in axial alignment with the valve disc 15, the compression screw is formed with a central bore 21 through which is entered the movable stop 22, one end of which rests on the guide member 15, the upper end of the movable stop projects through the head 1 and the cap 23. The movable stop is formed or provided with a shoulder 22a which is engaged by the adjustable screw 23a screw threaded through the cap 23 and arrests the movement of the stop. The pressure at which the relief valve will open may be regulated by advancing or retarding the adjusting nut towards or away from the shoulder. If the control valve is operated in the reverse position the springs 6a and 18a may be dispensed with.

In operation, the inlet channel is connected to a water supply line under pressure and the outlet port 8 is connected to the water pressure system. With the valve in the position shown in the drawing the water is being admitted to the system through the inlet port 4, the inlet valve disc 6 having been moved away from its seat by the action of the spring 19 moving the relief valve structure towards the inlet opening thereby bringing the member 16 in contact with the stem 7. As the pressure in the system rises it acts on the diaphragm thereby moving the member 17 away from the stem 7, permitting the valve disc 6 to be moved towards its seat by the pressure of the supply water shutting off the flow of water into the system entirely when the predetermined minimum pressure of the system is reached, this minimum pressure being set by the tension of the compression spring 19 acting on the diaphragm. As the pressure within the system rises, for example by expansion of the water within the system, further pressure is exerted on the diaphragm moving it and the relief valve towards the head 1, this movement continuing until the shoulder of the movable stop contacts with the cap 23, this occurring when the predetermined maximum pressure is reached. The predetermined maximum pressure at which the relief valve is desired to open depends on the travel of the adjustable stop, this being regulated by increasing or decreasing the distance between the screw 23a and the head, this being effected by means of the adjusting nut 24 on the end of the cap adjacent the head. Whenever desired it may be determined whether the control valve is in proper working condition by manually actuating the movable stop downwards, thus moving relief valve disc out of engagement with its seat, thereby permitting the water to flow out of the system through the discharge port and by continuing the movement of the stop further, moving the inlet valve disc out of engagement with its seat. In this manner it can be quickly ascertained whether the valve discs are functioning properly. As soon as the pressure is released from the movable stop the valve discs will immediately be returned to their normal position.

It will be observed that in a valve constructed according to this invention that the only pressure acting to force the valve disc against its seat is the fluid pressure within the system, in the case of the relief valve and the initial pressure in the feed line, in the case of the reducing valve.

Having thus fully described my invention what I claim as new and desire to secure by Letters Patent is:

1. A control mechanism for maintaining the pressure within a fluid pressure system between a predetermined maximum and minimum, comprising a sectional casing having an inlet, an outlet and a discharge, and further having a transverse partition between the inlet and the outlet, a disk-like diaphragm having only its marginal portion anchored between the sections of the casing, said diaphragm being located between said outlet and said discharge, a valve seat carried by said diaphragm, a laterally ported cup-like member mounted on said partition and having a valve seat communicating with said inlet, a laterally ported tubular member connected with said first named valve seat and slidable axially of said cup-like member, a valve within said tubular member for cooperation with said first named valve seat, spring means within said tubular member normally urging said valve to its seat, a second valve cooperating with said second named valve seat, spring means normally urging said second named valve to its seat, and a strut connection between both of said valves.

2. A control mechanism for maintaining the pressure within a fluid pressure system between a predetermined maximum and minimum, comprising a sectional casing having an inlet, an outlet and a discharge, and further having a transverse partition between the inlet and the outlet, a disk-like diaphragm having only its marginal portion anchored between the sections of the casing, said diaphragm being located between said outlet and said discharge, a valve seat carried by said diaphragm, a laterally ported cup-like member mounted on said partition and having a valve seat communicating with said inlet, a laterally ported tubular member connected with said first named valve seat and slidable axially of said cup-like member, a valve within said tubular member for cooperation with said first named valve seat, spring means within said tubular member normally urging said valve to its seat, a second valve cooperating with said second named valve seat, spring means normally urging said second named valve to its seat, a strut connection between both of said valves, and a plunger slidable from the exterior of the casing for unseating both valves.

3. A control mechanism for a fluid pressure system comprising a hollow body having an inlet, an outlet and a discharge opening and a partition between the inlet and the outlet, said partition being formed with an opening, a laterally ported cup-like member seated on said partition and having a reduced extension threaded through the opening therein and projecting beyond the inlet side of the partition, said projecting end being formed as a valve seat, a laterally ported tubular member slidably mounted within said cup-like member, a diaphragm carried by said tubular member, a valve seat screwed into the tubular member and having a portion cooperating with the tubular member for clamping the diaphragm thereto, a valve for cooperation with said second named valve seat, spring means within the tubular member for urging said valve toward said second named seat, a piston having a spring housed therewithin and carrying a valve for cooperation with said first named valve seat, a strut secured to said piston and having abutting engagement with one side of said first named valve, adjustable spring means opposing movement of said diaphragm under the influence of pressure within the system, and a longitudinally slidable member limiting movement of the first named valve and operable from the exterior of the device to unseat both of said valves, said strut constituting the operative connection between said valves.

4. A control mechanism for a fluid pressure system for maintaining the pressure within the system between maximum and minimum limits, comprising a hollow body having an inlet, an outlet and a relief opening, a diaphragm located between the outlet and the relief opening, a valve seat carried by said diaphragm, adjustable spring means engaging said seat for resisting movement of the diaphragm in response to increase of pressure within the system, a valve cooperating with said seat and normally maintained on said seat by the pressure within said system and movable in engagement therewith during predetermined movement of the diaphragm in response to increase of pressure within the system, an abutment member extending exteriorly of the body having limited longitudinal movement within the body in engagement with said valve for maintaining the same stationary after predetermined movement of said valve seat and valve with the diaphragm whereby continued movement of the diaphragm and valve seat under the influence of increased pressure within the system will cause separation of said seat and valve, a partition between the inlet and the outlet, a valve seat within said partition, a normally closed inlet valve cooperating with said second named seat and of greater size than the same to be subjected to the pressure of fluid entering the inlet and the pressure within the system, and a strut carried by one valve and abutting the other for unseating said inlet valve when the pressure within the system is below the minimum predetermined pressure.

5. A control mechanism for maintaining the pressure within a fluid pressure system between a predetermined maximum and minimum, comprising a sectional casing having an inlet, an outlet and a discharge, and further having a partition between the inlet and the outlet, a diaphragm having its marginal portion anchored between the sections of the casing, said diaphragm being located between said outlet and said discharge, a valve seat carried by said diaphragm, a laterally ported cup-like member mounted on said partition and having a valve seat communicating with said inlet, a laterally ported tubular member connected with said first named valve seat and slidable axially of said cup-like member, a valve within said tubular member for cooperation with said first named valve seat and normally maintained closed by the pressure within the system, a valve cooperating with said second named valve seat, spring means normally urging said second named valve to its seat, and a strut connection between both of said valves.

E. W. WORK.